Aug. 11, 1931. J. S. LANG 1,818,141
SHOCK ABSORBER
Filed Dec. 19, 1927 2 Sheets-Sheet 2
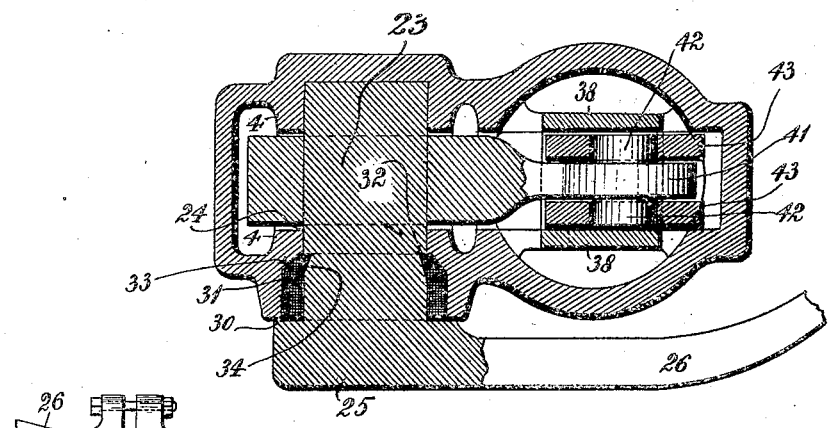
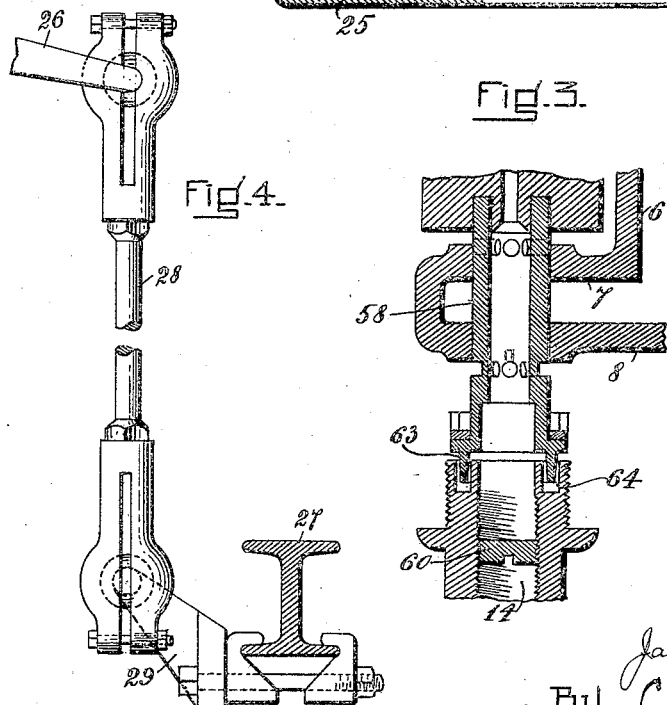
INVENTOR:
James S. Lang
By Coate Mayer
ATTORNEYS Patented Aug. 11, 1931

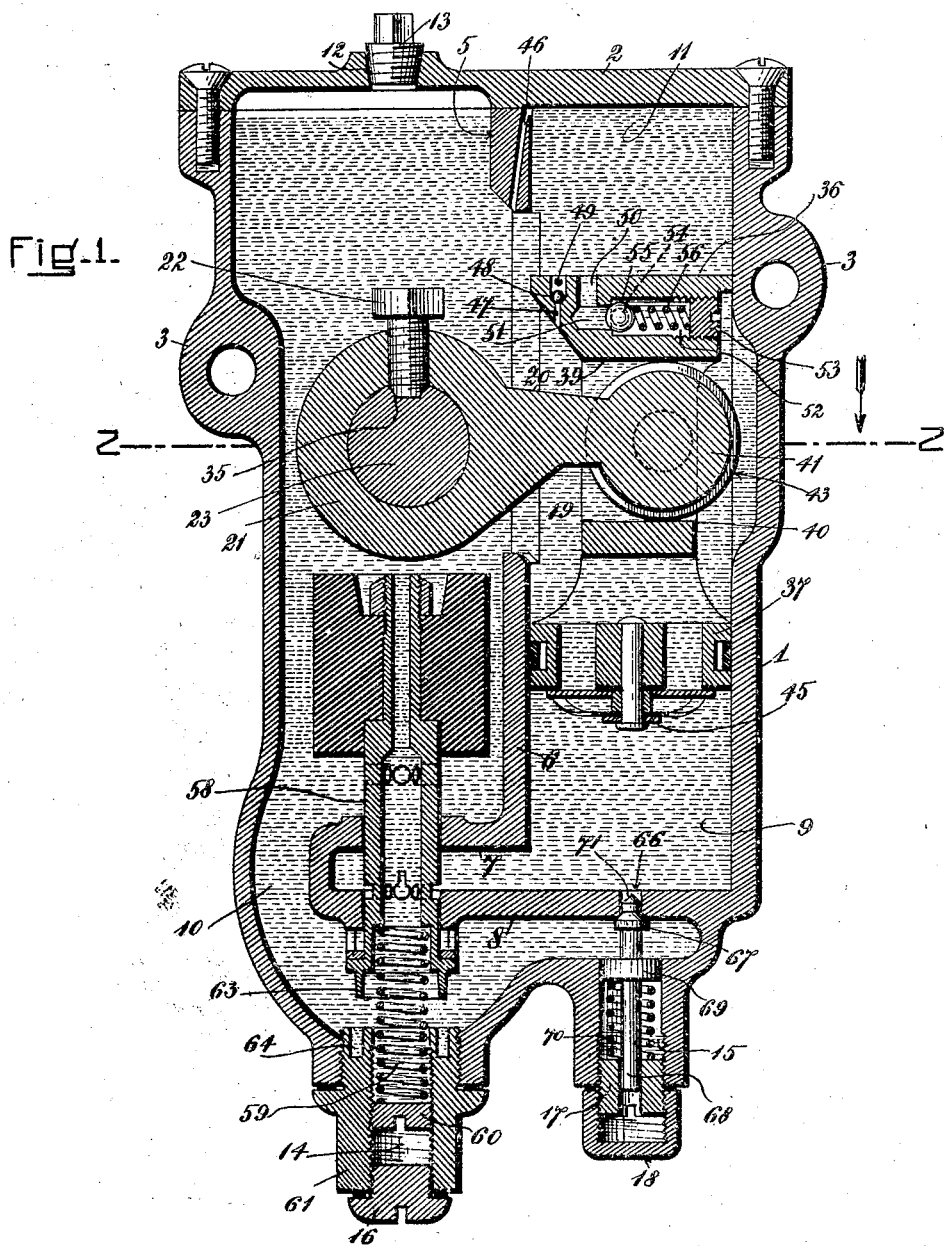

1,818,141

UNITED STATES PATENT OFFICE

JAMES S. LANG, OF BOSTON, MASSACHUSETTS; OLD COLONY TRUST COMPANY, EXECUTOR OF SAID JAMES S. LANG, DECEASED

SHOCK ABSORBER

Application filed December 19, 1927. Serial No. 240,975.

The present invention belongs to that class of shock absorbers which are especially adapted for motor vehicles, and in which the force required to pass a fluid through a constricted opening is utilized to prevent excessive vibration or rebound. Examples of this class of shock absorbers are shown in the various United States patents previously granted me and including Patent No. 1,448,131 of March 13, 1926 and Patent No. 1,561,009 of November 10, 1925.

The object of the invention is to improve the shock absorber in various details, all of which can best be seen and understood by reference to the drawings and detailed description later to be made.

In the drawings such portion of a shock absorber is shown as is necessary to a proper understanding of the invention and in which—

Figure 1 is a median vertical cross section of the shock absorber.

Fig. 2 is a cross section on the line 2—2 of Fig. 1.

Fig. 3 is a vertical cross section of a detail of construction shown in Fig. 1, a part thereof being shown in a changed position for illustrative purposes, and Fig. 4 shows partly in elevation and partly in cross section a further detail of construction to which reference will later be made.

Referring to the drawings:—

1 represents a casing having a removable cover 2. Projecting laterally from the casing are lugs or ears 3 by which it may be secured to the body or framework of a vehicle. On the inside the casing is provided with spaced bearings 4 for a rock shaft later to be referred to. The interior of the casing is also provided with various inside parts or partitions 5, 6, 7 and 8, respectively which provide within the casing a compression chamber 9 and outside this chamber a secondary chamber 10 with an opening between the two chambers having a valvular control to which reference will later be made. There is also provided inside the casing a compression chamber 11 in communication with the secondary chamber.

The casing forms a receptacle for oil or other suitable fluid contained within its respective chambers and is kept substantially filled with oil. The oil or other fluid is introduced into the casing at the top by way of an inlet 12 through the cover. This inlet is normally closed by a filling plug 13. At the bottom the casing is provided with outlets 14 and 15, respectively. Of these the outlet 14 is closed by a removable plug 16 and the outlet 15 by a removable plug 17 with attached cap 18. The openings 14 and 15 at the bottom of the casing provide outlets for the oil and also openings through which the parts above may be machined and through which openings also certain of the working parts of the shock absorber are introduced into the casing.

The compression chamber 9 is within a cylinder formed by the co-operation of the wall or partition 6 with the adjacent exterior wall of the casing, while the compression chamber 11 is within a cylinder formed by the co-operation of the partition 5 with the adjacent exterior wall of the casing. Contained to reciprocate within and between these respective chambers with passage through the secondary chamber is a piston 19. This piston is reciprocated by a rocker arm 20. This rocker arm is provided with a hub 21 which lies interposed between the bearings 4 of the casing and is secured by means of a set screw 22 to a rock shaft 23 which turns within said bearings. The rock shaft 23 at one end is socketed to turn within one of the bearings 4 and part of the casing adjacent to it. The other end of the rock shaft extends through an opening 24 in the opposite bearing 4 and adjacent side of the casing and bears upon its end outside the casing a head 25 to which is secured a rocker arm 26. This arm has connections with the axle 27 of the vehicle through a connecting rod 28 and clamp 29. (See Fig. 4.)

It is necessary that the joint between the rock shaft 23 and the casing where the shaft extends outside the casing through the opening 24 therein shall be a closed joint to prevent the escape of oil and especially under the present conditions where the shock absorber is kept substantially filled with oil and accordingly at a level above this joint. To this end the casing is machined to provide a packing gland 30 filled with suitable packing 31. The inner end of the gland 30 is so formed that the packing material contained therein will extend directly across the joint 24 between the rock shaft 23 and the adjacent bearing 4 or casing. For this purpose both the bearing 4 or casing and the adjacent portion of the rocker arm 23 are machined to provide an edge 32 which extends abruptly across the joint 24. This edge defines the inner end of the gland within which the packing is contained and accordingly the packing contained within the gland pressed into contact with the edge 32 will abruptly cross the joint between the rocker arm and its adjacent bearing at the point where the arm extends through the casing. In order that the packing may be crowded into the inner end of the gland the bearing 4 or casing and rock shaft are preferably provided with beveled portions 33 and 34, respectively, adjacent the inner end of the gland and co-operating to form a more or less conical cavity. The packing is held in place by the head 25 of the rock shaft. This head is held pressed hard against the packing, any suitable washer being interposed if necessary, by the set screw 22 which is preferably provided with a beveled end 35 which draws into a correspondingly formed cavity in the rock shaft when the screw is set for fastening the hub 21 of the rocker arm 20 to the rock shaft.

The rocker arm 20 functions to move the piston 19 up and down within the casing of the shock absorber during the functioning thereof. The piston 19 is provided with piston heads at its opposite ends 36 and 37, respectively. Between these heads of the piston it is provided with an intermediate portion formed to provide a housing within which the outer end of the rocker arm 20 is contained for reciprocating the piston. The housing presents side pieces or cheeks 38, and upper and lower spaced bearings 39 and 40, respectively. The inner end of the rock shaft is contained within the housing thus provided being laterally retained by the side cheeks and having engagement with the respective bearings. The inner end of the rocker arm 20 comprises a central flattened section 41 from the opposite sides of which extend hubs 42. On these hubs are arranged two turn wheels 43 and these wheels have bearing engagement with the upper and lower bearings 39 and 40 on the piston, the wheels being retained against lateral displacement by the respective cheeks 38. As the rocker arm 20 is reciprocated, reciprocating the piston, the wheels 43 will turn on the respective bearings and accordingly wear on these bearings is reduced to a minimum. Should occasion require the wheels may be easily replaced.

With the casing secured to the vehicle body and the rocker arm which reciprocates the piston connecting with the axle, the piston will accordingly be moved up and down within the casing as irregularities occur in the roadway over which the vehicle is passing. The shocks which a shock absorber most commonly overcome are those consequent upon impact which tends to suddenly raise the axle and compress the vehicle springs. In such case the violence of the impact might so compress the vehicle springs as would permit the vehicle body contacting with the axle causing shock, and the mechanism to which attention will now be directed is for the purpose of preventing any such shock. In the general operation of the shock absorber the arrangement is such that as the axle is moved toward the vehicle body with consequent compression of the springs the piston will be moved upward within the casing with the piston head 37 moving upwardly within the compression chamber 9. During this operation it is desired that the piston be unimpeded in so far as the action attends only a normal and proper compression of the vehicle springs and consequently the head 37 of the piston is provided with an outwardly-opening valve 45 which is preferably of a type like that shown in my pending application for Letters Patent of the United States, Serial No. 223,401. To prevent, however, any abnormal compression of the vehicle springs during this operation and especially any such compression as would cause the axle to come in contact with the vehicle body, the parts are so arranged (meaning especially the head 36 of the piston with relation to the compression chamber 11) that the piston head 36 will enter the compression chamber 11 at a time when the springs become abnormally compressed and before the axle has opportunity to strike the vehicle body. It will be observed that the compression chamber 11 is provided with a port 46 proceeding from the top end of said chamber and extending downward preferably at an angle through the partition 5 with outlet into the secondary chamber preferably at a point adjacent the bottom edge of the partition. Accordingly as the piston head 36 enters the compression chamber 11 the oil therein will become forcibly expelled through the port 46, the oil remaining therein then acting as a buffer or dash pot for retarding upward movement of the piston and thereby preventing further compression of the springs and in any event such compression as will prevent the axle striking the vehicle body.

It is necessary that the compression chamber 11 be kept filled or substantially filled with oil and the arrangement shown is such that this end will be attained even though the main level of oil in the secondary chamber of the casing is below the top of the casing. In other words, let it be assumed that the entire casing is filled with oil to a point where the level of oil will be below the top of the compression chamber or cover but above the outlet of the port 46 into the secondary chamber. In such case as the piston is raised the air in the compression chamber 11 will be forced out of this chamber into the secondary chamber by way of the port 46. On the drop of the piston, however, the head 36 thereof will act in the manner of a suction pump drawing oil out of the secondary chamber to fill the compression chamber 11, which operation continues until the piston head 36 has dropped below the lower edge of the partition 5. Thereupon the head of oil thus drawn into the compression chamber 11 filling it will remain therein as long as the top level of oil in the secondary chamber lies above the outlet to the port 46. In order to prevent disturbing influence on the oil in the secondary chamber as the piston is drawn out of the compression chamber 11 and to assist also in filling the space above the piston with oil as the piston is withdrawn a port 47 is preferably extended through the piston head 36 and this port is controlled by an inwardly opening valve 48 held in place by a keeper 49, the arrangement being such that the valve will close as the piston is moved upward into the compression chamber 11 and open as it moves downward with relation thereto.

In case the upward movement of the piston is so quick and forcible that sudden compression of oil within the chamber 11 might cause breakage of the working parts, provision is made whereby the oil when too highly compressed may be relieved from this chamber. To this end the piston head 36 is provided with a port 50 extending from the working side of the head and continued by way of a passage 51 into a chamber 52 inside the head. The end of this chamber is closed by a threaded plug 53. The chamber 52 has communication with the secondary chamber by way of a port 54. Communication between the passage 51 and the chamber 52 inside the head of the piston is controlled by an outwardly-closing valve 55 normally held in closed position by a spring 56 bearing at one end against the valve and its opposite end against the threaded plug 53. The tension of the spring 56 which normally holds the valve 55 in a closed position is such that when the compresson of oil within the chamber 11 by the piston becomes excessive then the oil therein will be relieved by way of the port 50, passage 51, thence by the open valve into the chamber 52 of the piston and outlet into the secondary chamber by way of the port 54.

While provision is thus made to overcome the shock that might be occasioned by the axle and vehicle body coming together following a violent compression of the springs, yet such shock is not a common occurrence as the vehicle wheels do not commonly strike any such obstruction as would cause the axle and vehicle body to come together. The customary shock which it is the function of the shock absorber to overcome following raising of the axle and compression of the springs is the backlash or quick rebound of the vehicle body following compression of the springs and occasioned by the springs as they are permitted to become untensioned to resume their normal shape.

The means employed to prevent this quick uplift or backlash of the vehicle body is substantially the same in principle and manner of operation as that recited in my said patents. The compression chamber 11 is provided with an outlet into the secondary chamber controlled by a weighted valve 58. This is an inertia valve and is maintained in a normal open position of substantial balance by a spring 59 which supports the valve and is itself supported by resting upon an adjustable nut 60 arranged within a plug fixture 61 in the lower end of the casing and through which extends the passage 14 closed by the plug 16 previously referred to. With the parts thus arranged, assuming the springs to be compressed, the ensuing tendency of the body of the vehicle to violently uplift or backlash is generally attended at the instant by a drop of the axle, whereupon the piston 39 will be reversed in its movement and the head 37 thereof moved downward into the compression chamber 9 compressing the oil therein, the valve 45 carried by this head of the piston then becoming closed. Substantially simultaneously with this action at about the precise instant, the vehicle body will tend to rise carrying with it the casing of the shock absorber. Thereupon the casing will move upward with relation to the valve 58 which maintains its position by reason of its inertia, and thereupon the valve will become closed shutting off communication between the compression chamber 9 and the secondary chamber. Consequently further downward movement of the piston head 37 into the compression chamber 9 will be stopped and consequently further uplift or backlash of the vehicle body prevented until the inertia valve again opens and the parts resume their substantial normal positions. All this is described in my said patents to which attention is directed for a more detailed description.

The opening of the inertia valve in the connection just described is an opening effected by the spring 59 which becomes tensioned as the casing, on which the spring is mounted, moves upwardly, the valve being opened as soon as the tension of the spring overcomes the inertia of the weighted valve. In order that this opening of the valve may be slightly more protracted than the time taken by the spring to overcome the inertia of the valve, the lower end of the valve has fitted to it a relatively deep flange 63 preferably annular in form. This flange is arranged in line with a socket 64 formed in the upper side of the plug fixture 61 above which the valve is arranged. The socket like the flange is made relatively deep and the chamber of the socket is only slightly larger than the flange so that when the flange is contained within the socket oil will not too freely enter the socket to fill the void left by the lifting flange. In other words, the arrangement of this flange and socket is such that in the operation of the parts when the casing moves upward for closing the inertia valve, the valve then remaining substantially still on account of its inertia, the top end of the plug fixture 61 will be made to approach the lower end of the valve whereupon the flange 63 will enter the socket 64 then filled with oil. Subsequently as the operation of the spring tends to overcome the inertia of the valve for restoring it to its normal open position with relation to the outlet from the compression chamber 11 this opening of the valve will be slightly retarded by the lag occasioned by the relatively slow withdrawal of the flange 63 from the oil-filled socket within which it is contained.

The retardation of the valve is increased the deeper the flange penetrates into the socket. It will be observed that the flange is made slightly beveled, the top end of the flange or where it joins the body of the valve being slightly wider than its bottom end. The width of the flange is less than the width of the socket, but when the flange is fully contained within the socket the top or wide end of the flange substantially fills the top end of the socket as shown in Fig. 3, being only a little less wide than the width of the socket. In consequence when the flange is fully contained within the socket, as the flange lifts, entry of oil into the socket to fill the void occasioned by the lifted valve will be impeded by the upper end of the flange which substantially fills the mouth of the socket. Inasmuch as the lifting of the flange will depend upon the re-entry of oil into the socket, consequently the lifting of the valve will be impeded depending as the broad or narrow portion of the flange is contained within the socket, there being very little impedance when the lower end of the flange is contained within the socket which permits a free re-entry of oil, but the impedance gradually increases as approach is made to where the broad top end of the flange is contained within the socket or when the flange is substantially fully contained therein.

In order to avoid such compression of oil by the piston within the compression chamber 9 as might endanger the interior working parts of the shock absorber, provision is made whereby this chamber will be vented in case the pressure becomes excessive. To this end a port 66 is formed extending through the partition 8 at the lower end of the compression chamber 9. This port is controlled by an inwardly-closing valve 67 which closes against the under side of the partition 7 around the port extending through the partition. This valve is provided with a valve stem which extends downward and works through the plug 17, previously referred to, acting as a guide for the stem. The stem is otherwise guided by a collar 69 arranged upon it and sliding upon the casing. The valve is held in a normal closed position by a powerful spring 70 interposed between the plug 17, forming a fixture, and the collar 69 on the stem. The tension of this spring is such that the valve will not be opened by pressure developed in the compression chamber 9 except in case this pressure becomes excessive when the valve will open permitting escape of the contained fluid. With the means thus employed permitting venting of the compression chamber under the conditions referred to difficulty has been encountered in that the pressure in the compression chamber may operate to slightly displace the valve from its seat with permitted escape of fluid in which case an objectionable chattering of the valve ensues. This chattering, however, is obviated by an extension 71 on the valve which extends upwardly to fit within the port 66 above the valve to substantially close said port when the valve is occupying its closed position. The valve extension 66 has such extension into the port when the valve is closed that it will be moved out of the port permitting a full escape of fluid only when the valve has been moved an appreciable distance away from its valve seat. In other words, the extension will permit escape of fluid from the compression chamber only when the valve has been moved so far away from its valve seat that when the fluid pressure is allowed to escape from the compression chamber no chattering of the valve can take place.

Having thus fully described my invention, I claim and desire to secure by Letters Patent of the United States:—

1. In a fluid check shock obsorber having a fluid-containing casing and a piston reciprocable within the casing, means for forming a compression chamber within the casing above the piston and within which oil contained within the casing may be compressed upon the lifting of the piston, said compression chamber being provided with a port extending from the upper end of said chamber downward and terminating at a point below the normal level of oil contained within the casing outside the compression chamber.

2. In a fluid check shock absorber having a fluid-containing casing and a piston reciprocable within the casing, means for forming a compression chamber within the casing above the piston and within which oil contained within the casing may be compressed upon the lifting of the piston, said means forming the compression chamber comprising in part a partition plate arranged in the top of the casing and having a downward extension into the casing, said partition being provided with a port extending through it from the top end of the compression chamber and terminating at a point below the normal level of the oil contained within the casing outside the compression chamber.

3. In a fluid check shock absorber for controlling the movement of a vehicle having a body and axle, a fluid-containing casing attachable to the body of the vehicle, a piston reciprocable within the casing, means connecting the piston with the axle of the vehicle whereby the piston will be positively reciprocated upward and downward within the casing, means for forming a compression chamber within the casing above the piston and within which oil contained in said casing may be compressed upon the lifting of the piston, said compression chamber being provided with a port extending from the upper end of said chamber downward and terminating at a point below the normal level of oil contained within the casing outside the compression chamber.

4. In a fluid check shock absorber, the combination comprising a fluid-containing casing, a piston reciprocable within the casing, a housing carried by the piston and comprising spaced side cheeks and spaced upper and lower bearings, means for reciprocating the piston comprising in part a rocker arm with end extending into said housing, said end of the rocker arm comprising a central hub-bearing portion with hubs extending laterally from opposite sides thereof, and wheels mounted upon said hubs laterally retained by the cheeks of the housing and having rolling engagement with the upper and lower bearings thereof.

5. A fluid check shock absorber for controlling the movement of relatively movable parts comprising an element attachable to one of said parts and having a pressure chamber, said element being provided also with means permitting of the circulation of a contained fluid into and out of said chamber and consisting in part of a controllable outlet, a piston attachable to the other of said parts and reciprocable in said pressure chamber, an inertia valve for controlling said outlet, tension means for holding said valve in a normal open position, a flange depending from said valve, and a fixture arranged below the valve having within it a socket for containing oil into which socket the flange is adapted to extend upon closing said valve, the chamber of said socket being only slightly larger than said flange whereby oil will not freely enter the socket on the lifting of the flange when the flange is appreciably contained within the socket.

6. A fluid check shock absorber for controlling the movement of relatively movable parts comprising an element attachable to one of said parts and having a pressure chamber, said element being provided also with means permitting of the circulation of a contained fluid into and out of said chamber and consisting in part of a controllable outlet, a piston attachable to the other of said parts and reciprocable in said pressure chamber, an inertia valve for controlling said outlet, tension means for holding said valve in a normal open position, a flange depending from said valve, said flange having a gradually downward contraction, and a fixture arranged below the valve having within it a socket for containing oil into which socket said flange is adapted to extend on the closing of said valve, the chamber of said socket being only slightly larger than said flange and the top end of the flange substantially filling the open end of the socket when the flange is substantially fully contained within the socket.

7. In a fluid check shock absorber, a fluid-containing casing having within it a compression chamber with a port leading therefrom to form a vent and a valve seat adjacent the outlet to said port, a piston for compressing the fluid within said chamber, an outwardly-opening valve controlling said port, means for yieldingly holding the valve in a normal closed position against said seat and an extension to said valve fitting inside said port substantially closing said port when the valve is closed and permitting of a full escape of fluid through the port only when the valve has been moved by the pressure an appreciable distance away from the valve seat.

8. In a fluid check shock absorber having a fluid-containing casing and a piston reciprocable within the casing, means forming a compression chamber within the casing above the piston within which oil contained within the casing may be compressed upon the lifting of the piston, means whereby oil may escape from the compression chamber when compressed therein by the piston, and means whereby on the withdrawal of the piston oil may enter the compression chamber to fill said chamber and maintain therein a level above the main level of oil contained within said casing.

9. In a fluid check shock absorber having a fluid-containing casing, a piston reciprocable within the casing, compression chambers formed within the casing above and below the piston and within which chambers oil will be compressed upon the lifting and lowering of the piston, means controlling the escape and return of oil from and to the compression chamber below the piston, and means controlling the escape and return of oil from and to the compression chamber above the piston including a passage leading from a point below the main level of oil contained within said casing to a point adjacent the top of said compression chamber above the piston.

10. In a fluid check shock absorber, a fluid-cintaining casing, a shaft journaled to turn on said casing with extension through an opening in the side thereof leaving a joint between the casing and shaft, said casing and shaft being formed to provide an edge extending across said joint and a packing gland leading to said edge, a packing contained in said gland, and means for applying pressure to the packing so contained.

11. In a fluid check shock absorber, a fluid-containing casing, a shaft journaled to turn on said casing with extension through an opening in the side thereof leaving a joint between said casing and shaft, said casing and shaft being formed to provide an edge extending across said joint and a packing gland leading to said edge with the end of the gland contracted onto said edge, a packing in said gland, and means for compressing the packing so contained.

JAMES S. LANG.